US009119117B2

(12) United States Patent
Song et al.

(10) Patent No.: US 9,119,117 B2
(45) Date of Patent: *Aug. 25, 2015

(54) SESSION TRANSFER METHOD AND METHOD FOR SUPPORTING SESSION CONTINUITY

(75) Inventors: Jae-Seung Song, Gyeonggi-do (KR);
Hyun-Sook Kim, Gyeonggi-do (KR)

(73) Assignee: LG Electronics Inc., Seoul (KR)

( * ) Notice: Subject to any disclaimer, the term of this patent is extended or adjusted under 35 U.S.C. 154(b) by 213 days.

This patent is subject to a terminal disclaimer.

(21) Appl. No.: 12/539,415

(22) Filed: Aug. 11, 2009

(65) Prior Publication Data

US 2010/0011112 A1     Jan. 14, 2010

Related U.S. Application Data

(63) Continuation of application No. 12/517,877, filed as application No. PCT/KR2008/003394 on Jun. 16, 2008.

(60) Provisional application No. 60/951,902, filed on Jul. 25, 2007.

(30) Foreign Application Priority Data

Feb. 4, 2008  (KR) .................. 10-2008-0011365
Apr. 16, 2009 (KR) .................. 10-2009-0032907

(51) Int. Cl.
  *G06F 15/16*    (2006.01)
  *H04W 36/00*    (2009.01)
  (Continued)

(52) U.S. Cl.
  CPC ....... *H04W 36/0027* (2013.01); *H04L 65/1016* (2013.01); *H04L 65/1083* (2013.01); *H04W 36/0011* (2013.01); *H04W 36/14* (2013.01); *H04W 80/10* (2013.01)

(58) Field of Classification Search
  CPC ............ H04W 48/18; H04W 36/0011; H04W 36/0027; H04W 80/04; H04W 80/10; H04L 45/00; H04L 65/1083; H04L 12/2602
  USPC .................. 709/227, 228; 455/436, 442, 411; 370/352, 331, 328
  See application file for complete search history.

(56) References Cited

U.S. PATENT DOCUMENTS 6,961,774 B1 * 11/2005 Shannon et al. .............. 709/227
7,133,677 B2   11/2006 Feder et al.
(Continued)

OTHER PUBLICATIONS

"Universal Mobile Telecommunications System (UMTS); Communication Continuity Management Object (MO) (3FPP TS 24.216 Version 7.1.0 Release 7); ETSI TS 124 216," ETSI Standards, Lis, Sophia Antipolis Cedex, France, vol. 3-CT1, No. V7.1.0, Jun. 1, 2007, XP014037804, 16 pages.

(Continued)

*Primary Examiner* — Thuong Nguyen
(74) *Attorney, Agent, or Firm* — Birch, Stewart, Kolasch & Birch, LLP

(57) ABSTRACT

A device and method for transferring a session. The method includes receiving a session continuity operator policy while performing a session with a target terminal via an original network; storing the session continuity operator policy; determining whether to transfer a whole or part of the session to a server according to a parameter in at least the session continuity operator policy; and sending to the server a session invitation message for a session transfer to transfer of the whole of the session if the whole of the session is determined to be transferred. The session invitation message includes information on at least one data to be transferred among a voice data and a non-voice data on the session. The session transfer corresponds to a PS (Packet Switching) to PS transfer.

17 Claims, 10 Drawing Sheets

(51) Int. Cl.
*H04L 29/06* (2006.01)
*H04W 36/14* (2009.01)
*H04W 80/10* (2009.01)

(56) References Cited

U.S. PATENT DOCUMENTS

| | | | |
|---|---|---|---|
| 7,315,742 B2* | 1/2008 | Creamer et al. | 455/442 |
| 7,395,085 B1 | 7/2008 | Mauer et al. | |
| 7,764,640 B2* | 7/2010 | Lee et al. | 370/328 |
| 2002/0116461 A1 | 8/2002 | Diacakis et al. | |
| 2004/0109460 A1* | 6/2004 | Banks et al. | 370/401 |
| 2004/0170191 A1 | 9/2004 | Guo et al. | |
| 2005/0070288 A1 | 3/2005 | Belkin et al. | |
| 2005/0243870 A1* | 11/2005 | Balogh et al. | 370/522 |
| 2005/0265382 A1* | 12/2005 | Hartikainen | 370/465 |
| 2005/0272481 A1 | 12/2005 | Kim | |
| 2006/0026288 A1* | 2/2006 | Acharya et al. | 709/227 |
| 2006/0126649 A1* | 6/2006 | Akiyoshi | 370/401 |
| 2006/0248211 A1 | 11/2006 | Hwang et al. | |
| 2006/0268858 A1 | 11/2006 | Hagale et al. | |
| 2006/0276192 A1* | 12/2006 | Dutta et al. | 455/436 |
| 2007/0004411 A1 | 1/2007 | Goldman et al. | |
| 2007/0014281 A1 | 1/2007 | Kant | |
| 2007/0015536 A1 | 1/2007 | LaBauve et al. | |
| 2007/0025294 A1* | 2/2007 | Kim et al. | 370/331 |
| 2007/0047709 A1 | 3/2007 | Brunson et al. | |
| 2007/0070948 A1 | 3/2007 | Kezys et al. | |
| 2007/0115899 A1 | 5/2007 | Ovadia et al. | |
| 2007/0189220 A1 | 8/2007 | Oberle et al. | |
| 2007/0211694 A1* | 9/2007 | Rasanen | 370/352 |
| 2007/0259633 A1 | 11/2007 | Rao | |
| 2008/0069050 A1* | 3/2008 | Dutta et al. | 370/331 |
| 2008/0080480 A1* | 4/2008 | Buckley et al. | 370/352 |
| 2008/0092163 A1* | 4/2008 | Song et al. | 725/39 |
| 2008/0159232 A1 | 7/2008 | Thalanany et al. | |
| 2008/0186953 A1* | 8/2008 | Buckley et al. | 370/352 |
| 2008/0240091 A1 | 10/2008 | Kesavan et al. | |
| 2008/0273682 A1* | 11/2008 | Bakker et al. | 379/201.12 |
| 2008/0293382 A1* | 11/2008 | Lubenski et al. | 455/411 |
| 2008/0299969 A1 | 12/2008 | Shatsky | |
| 2008/0310604 A1* | 12/2008 | Agarwal et al. | 379/88.18 |
| 2008/0318580 A1 | 12/2008 | Zhong et al. | |
| 2009/0005047 A1 | 1/2009 | Gupta et al. | |
| 2009/0041010 A1* | 2/2009 | Bakker et al. | 370/352 |
| 2009/0061847 A1* | 3/2009 | Roberts | 455/423 |
| 2009/0207807 A1 | 8/2009 | Mahdi et al. | |
| 2009/0285211 A1 | 11/2009 | Muramoto et al. | |
| 2010/0041380 A1 | 2/2010 | Hewes et al. | |
| 2010/0183002 A1* | 7/2010 | Gallant et al. | 370/352 |
| 2011/0130140 A1 | 6/2011 | Fadell | |

OTHER PUBLICATIONS

3GPP TSG SA WG2; "3rd Generation Partnership Project; Tehcnical Specification Group Services and Architecture; Multimedia Session Continuity; Stage 2 (Release 8)," 3GPP TR 23.893 V0.1.1, Aug. 13, 2007, pp. 1-15, XP002568657, 3GPP.org.

3GPP: 3rd Generation Partnership Project: Technical Specification Group Core Network and Terminals; Voice Call Continuity between the Circuit-Switched (CS) domain and the IP Multimedia Core Network (CN) (IMS) Subsystem; Stage 3 (Release 7), Jun. 20, 2007, pp. 1-122. XP002568668.

3GPP: "3rd Generation Partnership Project; Technical Specification Group Services and Architecture; Feasibility Study on Multimedia Session Continuity; Stage 2 (Release 8)," Nov. 28, 2007, XP050210023, 3GPP Draft; 23893-100, 3rd Generation Partnership Project (3GPP), 52 pages.

3GPP: "3rd Generation Partnership Project; Technical Specification Group Services and System Aspects; Voice Call Continuity (VCC) Between Circuit Switched (CS) and IP Multimedia Subsystem (IMS); Stage 2 (Release 7)," 3GPP TS 23.206 V7.3.0, Jun. 19, 2007, pp. 1-36, XP002568667.

Motorola: "Solution for PS-PS Session Continuity", 3GPP Draft; S2-072542 MMSC_PS-PS Solution, 3rd Generation Partnership Project (35PP), vol. SA WG2, No. Orlando; Jun. 19, 2007, XP050260134, 4 pages.

Schulzrinne et al., "Application-Layer Mobility Using SIP," Mobile Computing and Communications Review, ACM, New York, NY, vol. 4, No. 3, Jul. 1, 2000, pp. 47-57 XP000992003.

Ali-Yahiya et al., "A Case Study: IEEE 802.21 Framework Design for Service Continuity across WLAN and WMAN", 2007 International Conference on Wireless and Optical Communication Networks, pp. 1-5, Jul. 2007.

Xin et al., "Policy based End-to-End Service Control Framework Beyond 3G Mobile Network", 2004 IEEE 60th Vehicular Technology Conference, vol. 7, pp. 4777-4780, Sep. 2004.

\* cited by examiner

FIG. 9

| Session Transfer Operator Policy Parameter | Description |
|---|---|
| SC Policy Type | parameter indicating whether SC Operator policy is temporary or is required to be maintained by being continuously stored in UE |
| Immediate SC | parameter corresponding to SC Command or Indication serves to allow MMSC AS to indicate that Session Continuity is required to be performed when preferred access or domain is usable to MMSC UE. For example, Immediate SC = 1 (indicate that Session Continuity toward preferred domain and/or access is required to be immediately performed when corresponding access/domain is usable) Immediate SC=0 (Indicate that Session Continuity toward preferred domain and/or access is not required to be immediately performed when corresponding access/domain is usable)<br>This parameter can be used with SC Priority. |
| SC Priority | parameter indicating Priority with respect to performance of Session Continuity in SC Operator Policy. For example, it can have values below.<br>'High'-indicate that MMSC AS recommends MMSC UE to immediately perform Session Continuity.<br>'Medium'-indicate that MMSC AS is required to inform MMSC UE that it had better perform Session Continuity as soon as possible.<br>'Low'-indicate that MMSC AS is required to inform MMSC UE that it can perform Session Continuity. |
| Preferred SC Access/Domain | representing Access/Domain preferred when Session Continuity is generated.<br>Domain can be classified into CS, PS UTRAN or the like.<br>Access can be classified into WIMAX, LET, WLAN, PS access or the like by being subdivided into specific ID (for example, SSID of WLAN) according to Roaming agreement of operator. |
| SC Restriction | indicates Restriction (Applicability) for Session Continuity to specific Access or Domain. For example,<br>Access A-Access B=1 (SC to Access B from Access A is restricted)<br>Access A-Access B=0 (SC to Access B from Access A is applicable) |
| SC Type | means various SC types proposed by MMSC and usable when Operator proposes preferring SC Type while performing SC. For example, it can be defined as<br>PS-PS=1<br>PS-PS in conjunction with PS-CS=2<br>UE transfer =3<br>PS-PS partial session continuity=4 or the like,<br>and allocation of additional Scenario and values is possible. |
| SC Composition | Partial Session Continuity, that is content about composition of session when partial session is transferred, not entire current session should be included. This parameter includes content for the composition of the session. For example, the parameter can be composed of<br>Access A=voice and Access B=video<br>Access A=voice + video<br>Access A=voice and Drop video, or the like. |
| SC Expire Timer | Parameter indicating Expire time of corresponding SC Operator Policy. For example, SC Expire Time=3600 (indicate that corresponding Session Continuity Operator Policy is Expired 1 hour later.) |

SESSION TRANSFER METHOD AND METHOD FOR SUPPORTING SESSION CONTINUITY

This application is a Continuation of co-pending application Ser. No. 12/517,877 filed on Jun. 5, 2009, which is a National Stage of International Application No. PCT/KR2008/003394 filed on Jun. 16, 2008, which claims priority under 35 U.S.C. §119(e) to U.S. Provisional Application No. 60/951,902 filed Jul. 25, 2007, and claims priority under 35 U.S.C. §119(a) to Korean Patent Application 10-2008-0011365 filed in the Republic of Korea on Feb. 4, 2008. The present application also claims priority to Korean Patent Application 10-2009-0032907 filed Apr. 16, 2009, which is a divisional of Korean Patent Application 10-2008-0011365. The entire contents of all are hereby incorporated by reference.

TECHNICAL FIELD

The present invention relates to session mobility, more particularly, to a technology which is capable of transferring a session to another network and maintaining the same.

BACKGROUND ART

Session mobility means transfer of a session performed via a first network to a second network when a terminal is required to change its access to the second network from a current first network due to a change of a geographical position while performing the session with an external entity via the first network. As such, the transfer of the session without discontinuity is referred to as session continuity.

The session continuity may be implemented, for example, by allowing a terminal being performing a session via a WLAN to perform the session via a UTRAN/GERAN when the terminal is moved to the UTRAN/GERAN due to a change of a geographical position or the like.

The session continuity will be described in detail with reference to FIG. 1 hereafter.

FIG. 1 is an exemplary view showing session continuity in accordance with the related art. Referring to FIG. 1, a UE-a is located in coverage of a WLAN and performs a session with a UE-b for sending of voice data and non-voice data via the WLAN (S11).

Hereafter, the UE-a geographically moves to coverage of a UTRAN/GERAN (S12).

The UE-a sends a CS SETUP message to an MGCF via a CS domain of the UTRAN/GERAN so as to maintain the session for voice even if the UE-a is to be located in the coverage of the UTRAN/GERAN (S13).

The MGCF receives the CS SETUP message and then sends an INVITE request having a VDN as a URI (INVITE R-URI=VDN) to an application server (AS) (S14).

The application server (AS) receives the message and then sends a re-INVITE to the UE-b so as to re-establish the session for voice with the UE-b (S15).

Likewise, the UE-a sends the INVITE request having a VDI as the URI (ex., INVITE R-URI=VDI) together with a Replaces header to the application server (AS) so as to maintain the session for non-voice data even if the UE-a is to be located in the coverage of the UTRAN/GERAN (S16).

The application server (AS) receives the message and then sends a re-INVITE to the UE-b so as to re-establish the session for non-voice data with the UE-b (S17).

By the procedures, the UE-a can continuously maintain the session with the UE-b.

In the aforementioned related art, the session continuity is supported only when the terminal is geographically moved. That is, in the related art, the session continuity is supported only when a radio environment of the terminal is changed or a usable radio resource thereof is changed.

However, the aforementioned related art cannot propose a solution for a case that a first network is required to be temporarily stopped due to maintenance by a service operator or a case that terminals are required to be moved to a second network due to a load balancing or the like.

Also, the aforementioned related art has a drawback that it supports session transfer regardless of a terminal user's intention. That is, in case that the second network charges more, the session is transferred regardless of the user's intention. Else, there is another drawback that whether or not the session transfer is supported depends on a manufacturer of a terminal or a service operator.

DISCLOSURE OF THE INVENTION

Technical Problem

Therefore, it is an object of the present invention to transfer an ongoing session to another network when it required by a service operator.

Further, it is another object of the present invention to perform session transfer according to a user's intention.

Technical Solution

To achieve the objects of the present invention, there is provided a method for supporting session continuity for a terminal in a server, the method comprising, sending a session continuity operator policy to a first terminal under a state that the first terminal is performing a session via an original network with a second terminal for sending one or more of voice and non-voice data; receiving a session invite message from the terminal via a target network; and sending a session invite message to the second terminal so as to transfer the session to the target network, in response to receipt of the session invite message.

Further, to achieve the objects of the present invention, there is provided a method for transferring a session, the method comprising, receiving a session continuity operator policy while performing a session with a target terminal through an access to an original network; and determining whether the session is to be immediately transferred to a target network by checking a parameter in the session continuity operator policy.

BRIEF DESCRIPTION OF THE DRAWINGS

FIG. 9 is an exemplary view showing parameters of a session continuity operator policy.

MODES FOR CARRYING OUT THE PREFERRED EMBODIMENTS

There is an exemplary UE (User Equipment) in accompanying drawings, however the UE may be referred to as terms such as a terminal, an ME (Mobile Equipment), etc. And, the UE may be implemented as a portable device such as a notebook, a mobile phone, a PDA, a smart phone, a multimedia device, etc, or as an unportable device such as a PC or a vehicle-mounted device.

Hereafter, prior to description of main characteristics of the present invention, the kind of transfer (or move) of session will be described with reference to FIGS. 2 to 6, for better understanding.

(1) Combined Session Update:

If a UE-a being transceiving voice data and non-voice data to/from a UE-B via a first network, namely, an original network is moved to a second network, namely, a target network, the voice data and the non-voice data are to be transceived via the target network the same as being transceived via the original network.

The combined session update may be implemented by three cases as follows.

Figure 1:
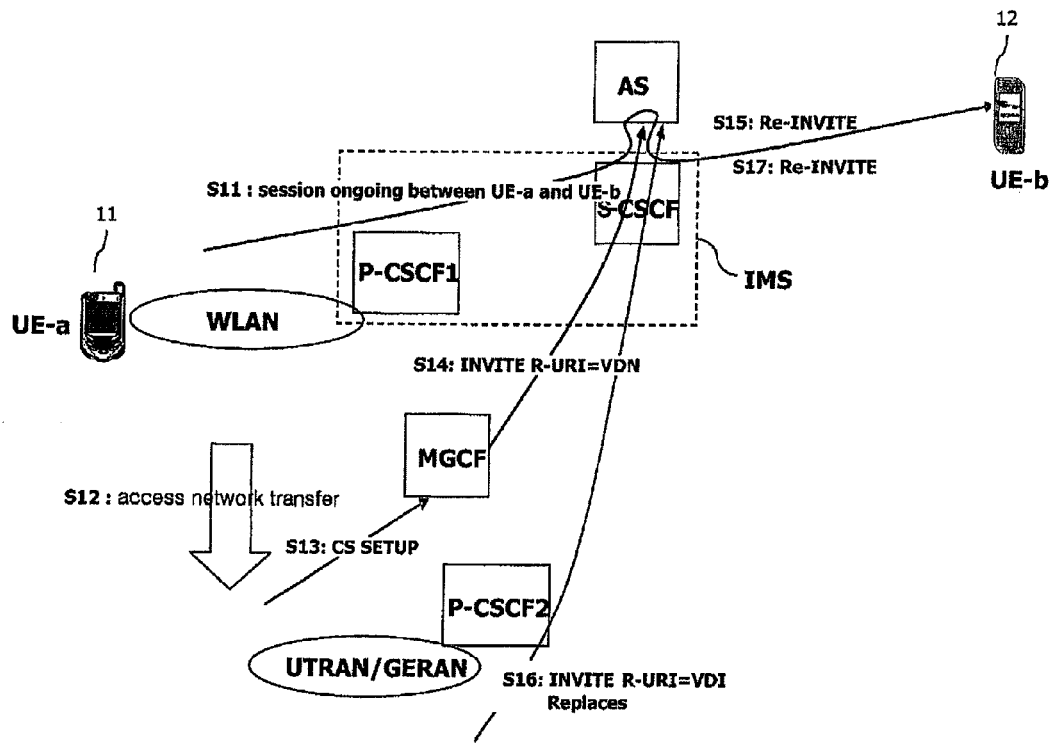
FIG. 1 is an exemplary view showing session continuity in accordance with the related art.
Figure 2:
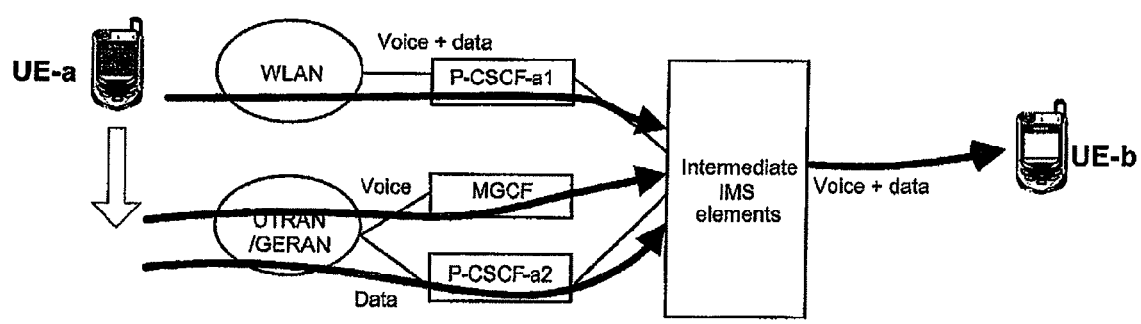
FIG. 2 is an exemplary view showing one example of session transfer.

1) A first case is a PS to CS+PS session update, referring to FIG. 2. That is, a single session is divided into a CS-based session for voice data and a PS-based session for non-voice data to be performed, if a UE-a being sending the voice data and the non-voice data on the single session via an original network, e.g., a PS (Packet Switching) domain such as a WLAN is moved to a target network, e.g., a mobile communication network (e.g., UTRAN/GERAN). This is called as a PS to CS+PS. In the first case, for the transfer (or move) of the session, the UE-a should send a call setup message (or a call originating message) (e.g., SETUP message) via a CS domain of the UTRAN/GERAN, and send a session invite message (or session initiation request message) (e.g., SIP-based INVITE message) via a PS domain of the UTRAN/GERAN.

Figure 3:
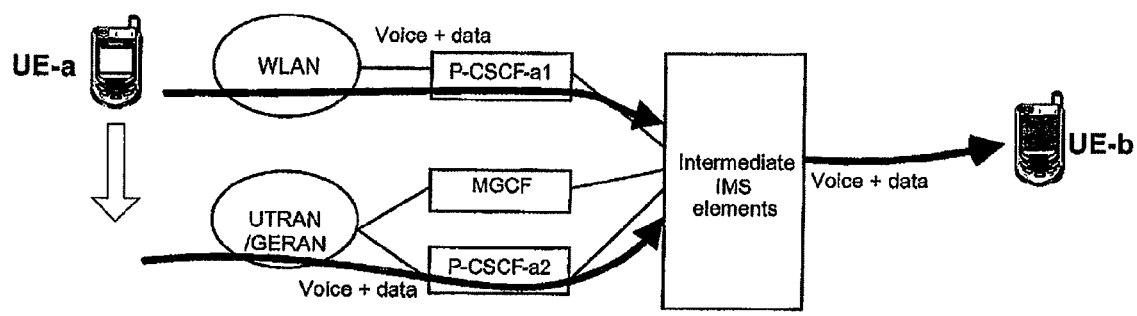
FIG. 3 is an exemplary view showing another example of session transfer.

2) A second case is a PS to PS update, referring to FIG. 3. That is, a single session is maintained. In more detail, voice data and non-voice data are transceived on a single session via a PS (Packet Switching) domain, if a UE-a being sending the voice data and the non-voice data on the single session via an original network, e.g., the PS domain such as a WLAN is moved to a target network, e.g., a mobile communication network (e.g., UTRAN/GERAN) (or, in case that the UE-a being sending the voice data and the non-voice data on the single session via the PS of the UTRAN/GERAN is moved to the WLAN). This is called as a PS to PS. In the second case, for the session update, the UE-a sends a session invite message (or session initiation request message) (e.g., SIP-based INVITE message) only via the PS domain of the target network.

Figure 4:
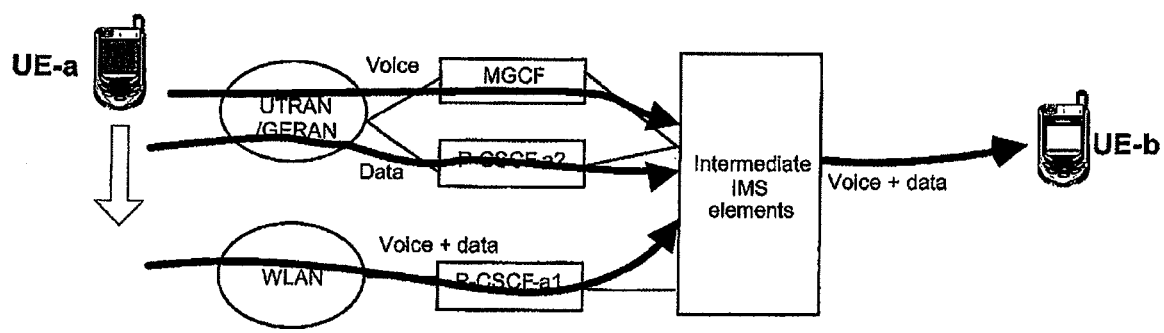
FIG. 4 is an exemplary view showing still another example of session transfer.

3) A third case is a CS+PS to PS update, referring to FIG. 4, that is, opposite to the first case. That is, two sessions are combined into a single PS domain-based session and performed in a target network if a UE-a being performing with at least two sessions, which includes a CS domain-based session for voice data and a PS domain-based session for non-voice data via an original network, e.g., UTRAN/GERAN, is moved to a target network, e.g., a PS domain such as a WLAN. This is called as a CS+PS to PS. In the third case, for the session update, the UE-a sends one session invite message (or session initiation request message) (e.g., SIP-based INVITE message) via the target network.

Figure 5:
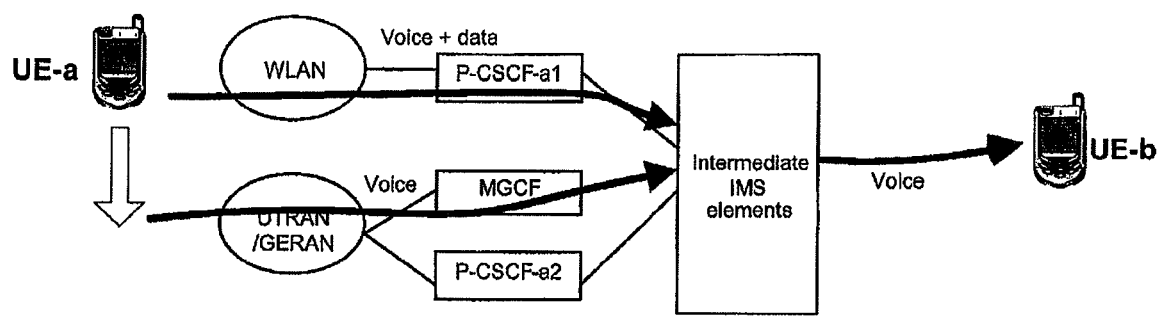
FIG. 5 is an exemplary view showing yet still another example of session transfer.

(2) Separate (split) session update with dropping, referring to FIG. 5, means that if transceiving for any one of voice data and non-voice data is not supported in a target network or a user or operator does not desire to support sending for a specific data in the target network when a UE-a being sending the voice data and non-voice data via an original network is moved to the target network, the sending for the any one data is stopped and the sending for another data is performed via the target network.

Figure 6:
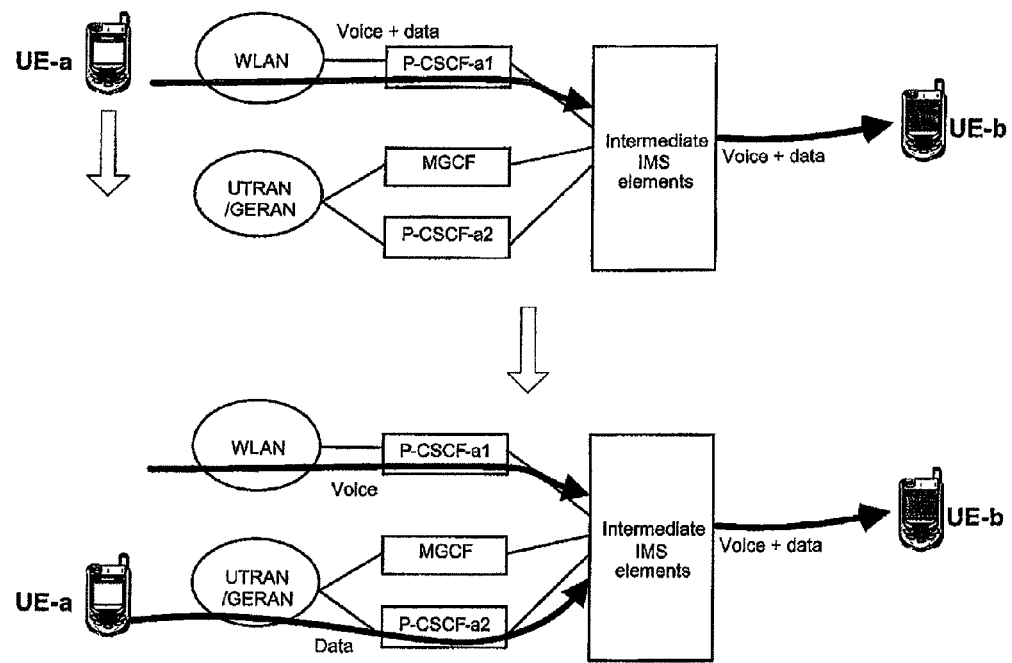
FIG. 6 is an exemplary view showing yet still another example of session transfer.

(3) Separate (split) session update, referring to FIG. 6, means that any one of voice data and non-voice data is send via a target network while another one thereof is send as it is via an original network when a UE-a being sending the voice data and the non-voice data via the original network is moved to the target network.

Hereafter, main characteristics in accordance with embodiments of the present invention will be described with reference to FIGS. 7 and 9. Here, technical details unrelated to the main characteristics of the present invention will not be described but referred to contents of a standard document 3GPP 23.893V0.1.0. Therefore, even if the details are not disclosed in this specification, those skilled in the art can understand the present invention through the aforementioned standard document.

Each entity shown in the accompanying FIGS. 7 and 8 will be described for better understanding.

1) SSMF abbreviated from Session Split/Merger Function performs an operation by a B2BUA (Back-to-back user agent), as an IMS-based application server for managing (separating or combining) sessions for session continuity.

2) eDTF is an entity having a domain transfer function proposed from a R7 VCC (Voice Call Continuity).

3) MMSC-AS abbreviated from Multimedia Session Continuity Application Server is a server for managing sessions for session continuity. The MMSC-AS may include the SSMF and the eDTF. Functions of the SSMF and the eDTF may be included in one or more entities.

Figure 7:
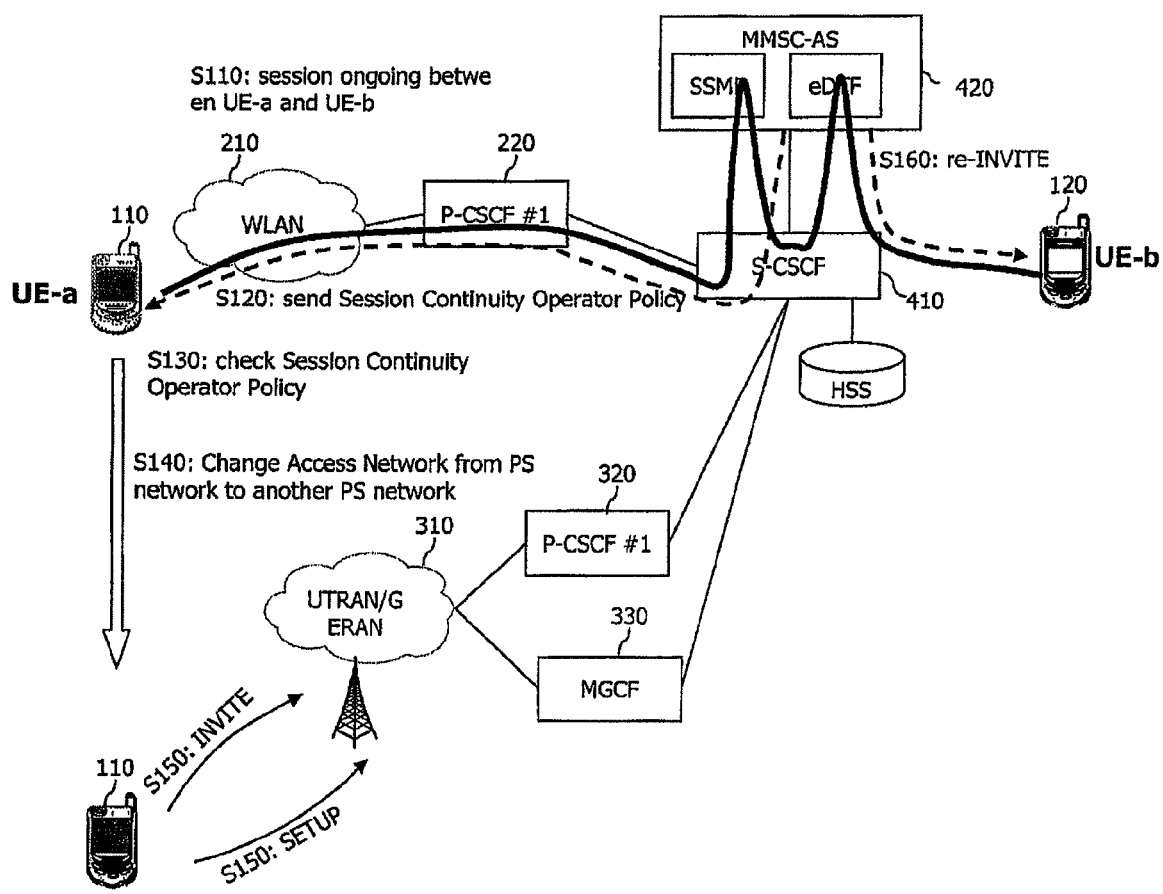
FIG. 7 is an exemplary view showing support for session continuity in accordance with a first embodiment of the present invention.

FIG. 7 is an exemplary view showing support for session continuity in accordance with a first embodiment of the present invention. And, FIG. 9 is an exemplary view showing parameters of a session continuity operator policy (or a session transfer operator policy).

Referring to FIG. 7, the first embodiment of the present invention is characterized that a session continuity operator policy or a session transfer operator policy shown in FIG. 9 is sent to a UE-a 110 so as to allow a session of the UE-a 110 to be immediately transferred to another network. Hereafter, it will be described in detail.

1) UE-a 110 is performing a session for sending voice and non-voice data via an original network, e.g., WLAN, a network according to an IEEE 802.16 standard, or else PS with a UE-b 120 (S110).

2) When it is required to immediately transfer (or move) the session of the UE-a 110 to another network, an MMSC-AS 420 sends the session continuity operator policy (or, session transfer operator policy) to the UE-a 110 (S120). Here, the session continuity operator policy (or, session transfer operator policy) may be sent from the MMSC AS or an SSMF or eDTF, i.e., logical entities of the MMSC AS.

Here, the transfer of the session is required when the network is required to be temporarily stopped due to repairing/ checking for the network, when it is required to perform a network load balancing, when the UE-a 110 is required to more effectively perform the ongoing session, when the policy of the service operator is changed, or the like.

And, cases that the MMSC-AS 420 sends the session continuity operator policies will be described as follows. First, when receiving raw data (e.g., information related to radio environment information, radio signal power, a load balancing policy, a network maintenance (or network checking) or the like for the UE-a 110), the MMSC-AS 420 generates the session continuity operator policy based on the raw information and then determines whether the session of the UE-a 110 is required to be transferred or not. And then, if the session is required to be transferred, the session continuity operator policy is sent to the UE-a 110. Second, when directly receiving the session continuity operator policy from an external entity, the MMSC-AS 420 transfers the session continuity operator policy to the UE-a 110. Third, the MMSC-AS 420 collects information related to radio environment information, radio signal power, the load balancing policy, the network maintenance (or network checking) or the like for the UE-a 110 by itself, and generates the session continuity operator policy based on the collected information. And, the MMSC-AS 420 determines whether the session of the UE-a 110 is required to be transferred or not, and then sends the session continuity operator policy to the UE-a 110 if the session is required to be transferred.

The session continuity operator policy, as shown in FIG. 9, include at least one of an SC Policy Type parameter, an immediate SC parameter, an SC Priority parameter, a Preferred SC Access/Domain parameter, an SC Type parameter, an SC Composition parameter, an SC Expire Timer parameter. Here, in the first embodiment, an SC Restriction parameter shown in the session continuity operator policy is not used so as to allow the ongoing session to be immediately transferred to another network. And, in order to allow the ongoing session to be immediately transferred to another network, the SC Priority parameter in the session continuity operator policy may be set as 'Should (High)', and the immediate SC parameter may be set as 1 (the session transfer can be implemented with only the SC Priority parameter without the immediate SC parameter). Meanwhile, the SC Type parameter of the session continuity operator policy may include an indication for indicating which kind of the session transfer should be performed by the UE-a 110. That is, the SC Type parameter may include the indication for allowing the UE-a 110 to perform the PS to CS+PS update of the combined session update. In FIG. 9, there is a value of the parameter as an example of the indication. However, it is merely exemplary, and the value can be expressed as various values. For example, the value of 11 may indicate the PS to PS update, 12 indicates the PS to PS+CS update, 21 indicates the PS+CS to PS update, 33 indicates the separate session update and 44 indicates the separate session update with dropping. Such dynamic session continuity operator policy may include the SC Policy Type so as to be discriminated from a general operator policy and also include the Timer parameter so as to maintain the policy for a specific time.

3) The UE-a 110 receives the session continuity operator policy and checks the parameter included in the session continuity operator policy (S130). Here, the UE-a 110 receives the session continuity operator policy from the MMSC-AS 420 via an OMA DM interface, a Ut interface or a VI Reference Point specified in a TR 23.893 standard document.

4) Then, the UE-a 110 changes its access from a WLAN 210 to a target network such as a UTRAN/GERAN 310 or a 3GPP, as shown in the drawing, when the target network is usable, according to the parameter included in the session continuity operator policy (S140).

5) Then, the UE-a 110 sends a call setup message (or, call initiating message) (e.g., SETUP message) via a CS domain of the UTRAN/GERAN 310 so as to maintain the sending for voice data, and sends a session invite message (or session initiation request message) (e.g., SIP-based INVITE message) via a PS domain of the UTRAN/GERAN 310 so as to maintain the sending for non-voice data (S150).

6) Upon receiving the session invite message and the call setup message, the MMSC-AS 420 generates a session invite message (re-INVITE message) based on one or more of the session invite message and the call setup message and then sends to the UE-b 120 (S160).

If the UT-b 120 sends a positive response with respect to the session invite message (re-INVITE message), the UE-a 110 may update the session with the UE-b 120, and perform a voice session with the UE-b 120 via the CS domain of the UTRAN/GERAN 310 and perform a non-voice session with the UE-b 120 via the PS domain of the UTRAN/GERAN 310.

As aforementioned, the first embodiment of the present invention is characterized that the session continuity operator policy is sent to the UE-a 110 so as to immediately transfer the session of the UE-a 110 to another network. Here, the immediate SC parameter and the SC Priority parameter of the session continuity operator policy have values for immediately transferring the session.

According to the first embodiment, the service operator can immediately transfer the ongoing session to another network, accordingly it is capable of dealing with the cases that the network is required to be temporarily stopped due to repairing/checking for the network, it is required to perform a network load balancing, it is required to more effectively perform the ongoing session, the policy of the service operator is changed.

Figure 8:
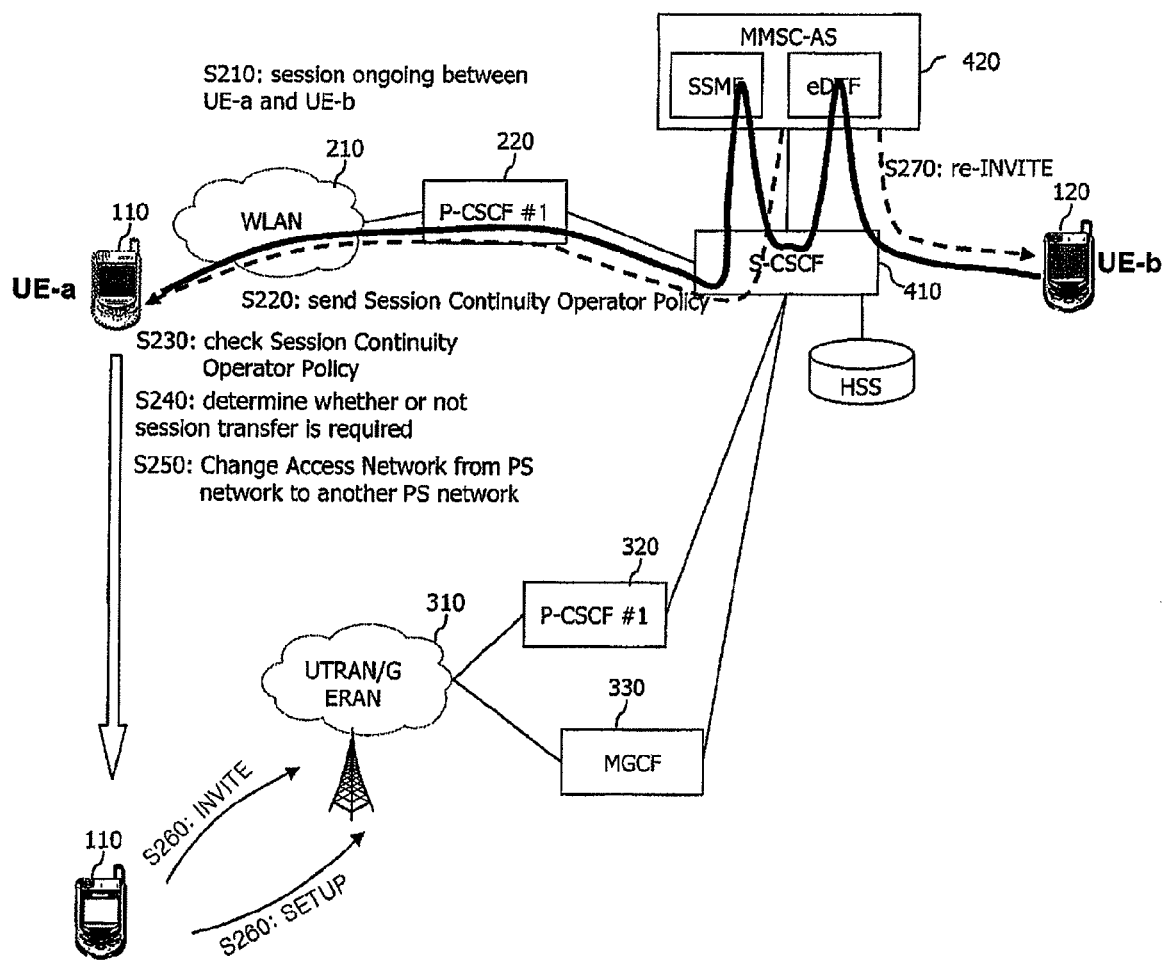
FIG. 8 is an exemplary view showing support for session continuity in accordance with a second embodiment of the present invention.

Meanwhile, FIG. 8 is an exemplary view showing support for session continuity in accordance with a second embodiment of the present invention.

Referring to FIG. 8, the second embodiment of the present invention is characterized that the session continuity operator policy is sent to the UE-a 110 and the UE-a 110 determines whether or not the ongoing session is to be transferred to another network according to a user's intention, as shown in FIG. 9, when the ongoing session is required to be transferred later even though it is not required to be immediately transferred, or the session continuity operator policy is changed. The second embodiment has advantages in a case that the session transfer is not required to be immediately performed, that is the network is scheduled to be temporarily stopped in the near further due to the checking/repairing for the network.

Hereafter, it will be described in detail.

1) The UE-a 110 is performing a session with a UE-b 120 for transceiving voice and non-voice data via an original network, e.g., a WLAN, a network according to an IEEE 802.16 standard, or else PS (S210).

2) If the ongoing session is required to be transferred later even though it is not required to be immediately transferred, or the session continuity operator policy is changed, the MMSC-AS 420 sends the session continuity operator policy to the UE-a 110. Here, the session continuity operator policy may be sent from the shown MMSC AS or an SSMF or eDTF, i.e., logical entities of the MMSC AS, The MMSC-AS 420 may generate and send the session continuity operator policy according to raw data received from an external entity, or transfer by receiving from the external entity. Alternately, the MMSC-AS 420 may obtain data by itself and then generate the session continuity operator policy to send. Since the second embodiment is for a case that the session transfer is not immediately required, in the session continuity operator policy, the immediate SC parameter may be set as "0" and the SC Priority parameter may be set as "Should" (Medium) or "May" (Low) among the parameters shown in FIG. 9. Meanwhile, the session continuity operator policy may include the SC Restriction parameter. The SC Restriction parameter serves to restrict the session transfer to a specific access or domain. The UE-a 110 determines to transfer the session referring to the value of the SC Restriction parameter.

3) The UE-a 110 receives the session continuity operator policy and then checks a parameter included in the session continuity operator policy (S230). Here, the UE-a 110 receives the session continuity operator policy from the MMSC-AS 420 through an OMA DM interface, a Ut interface or a VI Reference Point specified in a TR 23.893 standard document.

4) The UE-a 110 determined whether or not the session transfer is required according to the parameter included in the session continuity operator policy. If it is determined that the session transfer is not required, the UE-a 110 updates the existing session continuity operator policy. However, if it is determined that the session transfer is required, the UE-a 110 can determine which network is appropriate for the session to be transferred to, for example, whether session transfer to a UTRAN/GERAN is appropriate or not. And, the UE-a 110 can determine the kind of the session update.

5) If it is determined that the session transfer is required, the UE-a 110 changes its access from the WLAN 210 to a target network such as the UTRAN/GERAN 310, as shown (S250). Alternately, the access may be changed from the WLAN 210 to a target network such as the 3GPP.

6) And, the UE-a 110 sends a call setup message (or, call initiating message) (e.g., SETUP message) via a CS domain of the UTRAN/GERAN 310 so as to maintain the sending for voice data, and sends a session invite message (or session initiation request message) (e.g., SIP-based INVITE message) via a PS domain of the UTRAN/GERAN 310 so as to maintain the sending for non-voice data (S260).

7) Upon receiving the session invite message and the call setup message, the MMSC-AS 420 generates a session invite message (re-INVITE message) based on one or more of the session invite message and the call setup message and then sends to the UE-b 120 (S270).

If the UT-b 120 sends a positive response with respect to the session invite message (re-INVITE message), the UE-a 110 may update the session with the UE-b 120, and perform a voice session with the UE-b 120 via the CS domain of the UTRAN/GERAN 310 and perform a non-voice session with the UE-b 120 via the PS domain of the UTRAN/GERAN 310.

As aforementioned, the second embodiment of the present invention is characterized that the UE-a 110 is informed that the session of the UE-a 110 is required to be transferred later according to the determination of the UE-a 110 using the session continuity operator policy, even though the session of the UE-a 110 is not required to be immediately transferred. The UE-a 110 can appropriately transfer the session when it is required according the determination of itself based on the session continuity operator policy.

The method in accordance with the present invention as so far described may be implemented by software, hardware, or any combination thereof. For example, the method in accordance with the present invention may be stored in a storage medium (e.g., internal memory, flash memory, hard disk, etc. of mobile terminal), and be implemented by codes or command words in a software program that is operable by a processor (e.g., internal microprocessor of mobile terminal). Hereafter, implementation by the hardware will be explained in detail.

Figure 10:
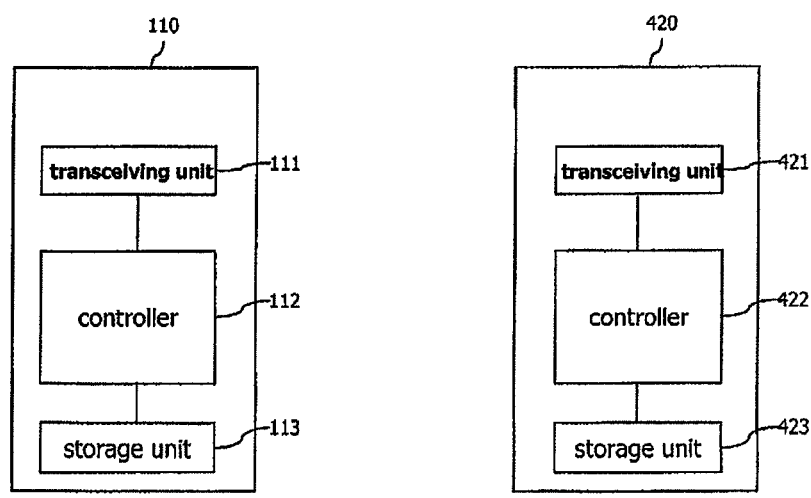
FIG. 10 is a block diagram showing configurations of a UE and an MMSC-AS in accordance with the first and second embodiments of the present invention.

FIG. 10 is a block diagram showing configurations of the UE and the MMSC-AS in accordance with the first and second embodiments of the present invention.

Upon receiving raw data (e.g., information related to radio environment information, radio signal power, the load balancing policy, the network checking or the like for the UE-a 110) from the external entity, the MMSC-AS 420 generates the session continuity operator policy based on the raw data or by collecting the information by itself and then sends the information to the UE-a 110. Alternately, the MMSC-AS 420 may receive the session continuity operator policy from the external entity and then sends to the UE-a 110.

The MMSC-AS 420 includes a transceiving unit 421, a controller 422 and a storage unit 423, as shown.

The transceiving unit 421 serves to receive the raw data from the external entity or receive the session continuity operator policy.

The controller 421 serves to generate the session continuity operator policy based on the raw data in case of receiving the raw data from the external entity through the transceiving unit 421. Alternately, the controller 421 may generate the session continuity operator policy based on its own information. And, the controller 421 transfers the session continuity operator policy to the UE-a 110 via the transceiving unit 421 in case of receiving the session continuity operator policy from the external entity.

The storage unit 423 serves to store the raw data or the session continuity operator policy.

Meanwhile, upon receiving the session continuity operator policy from the MMSC-AS 420, the UE-a 110 checks a parameter in the session continuity operator policy and determines whether the session transfer is immediately required or not. If it is determined that the session transfer is not immediately required, the UE-a 110 updates the existing session continuity operator policy.

The UE-a 110 includes a transceiving unit 111, a controller 112 and a storage unit 113.

The transceiving unit 111 serves to receive the session continuity operator policy from the MMSC-AS 420. Here, the transceiving unit 111 receives the session continuity operator policy from the MMSC-AS 420 via an OMA DM interface, a Ut interface or an M1 Reference Point specified in a TR 23.893 standard document.

The controller 112 checks a parameter in the session continuity operator policy and determines whether the session transfer is immediately required or not. If it is determined that the session transfer is not immediately required, the controller 112 changes the access through the transceiving unit 111 to another network, and generates a call setup message (or, call initiating message) (e.g., SETUP message) so as to maintain the sending for voice data and generates a session invite message (or session initiation request message) (e.g., SIP-based INVITE message) so as to maintain the sending for non-voice data.

The storage unit 113 stores the session continuity operator policy.

According to the present invention, the service operator can immediately transfer the ongoing session to another network, accordingly it is capable of dealing with the cases that the network is required to be temporarily stopped due to repairing/checking for the network, it is required to perform a network load balancing, it is required to more effectively perform the ongoing session, and the policy of the service operator is changed.

And, according to the present invention, when the ongoing session is required to be transferred later even though it is not required to be immediately transferred, or the session continuity operator policy is changed, it is capable of sending the session continuity operator policy to the terminal and then allowing the terminal to transfer the ongoing session to another network according to determination by itself.

Though the present invention is disclosed with respect to preferable embodiments in the above description, it will also be apparent to those skilled in the art that various modifications and variations can be made in the present invention without departing from the spirit or scope of the invention. Thus, it is intended that the present invention cover modifications and variations of this invention provided they come within the scope of the appended claims and their equivalents.

The invention claimed is:

1. A method for transferring a session for a first terminal that cooperates with a network, the method performed by the first terminal and comprising:
    receiving, by the first terminal, a session continuity operator policy while performing the session with a second terminal via an original network, wherein the session continuity operator policy includes a parameter indicating a preferred network for a transfer of an ongoing session, and session continuity level information including one of a first level indicating that the first terminal starts a session transfer to the preferred network and a second level indicating that starting of the session transfer is performed based on a decision of the first terminal;
    storing the session continuity operator policy;
    determining, by the first terminal, whether to transfer a whole or part of the session to a server according to a parameter in at least the session continuity operator policy; and
    sending, by the first terminal, to the server a first session invite message for the session transfer to transfer the whole of the session if the whole of the session should be transferred or transfer the part of the session if the part of the session should be transferred, unless the session continuity level information of the session continuity operator policy is the second level and the first terminal decides not to start the session transfer,
    wherein the first session invite message includes a Request Uniform Resource Identifier (R-URI) and information about at least one data to be transferred among voice data and non-voice data for the session,
    wherein the session transfer corresponds to a Packet Switching (PS) to PS transfer, and
    wherein a second session invite message is transmitted from the server to the second terminal within the preferred network to achieve session continuity.

2. The method of claim 1, wherein the first session invite message includes a Replace header.

3. The method of claim 1, wherein the session continuity operator policy includes a parameter indicating a type of session transfer.

4. The method of claim 1, wherein the session continuity operator policy includes a parameter indicating an unallowable domain or network.

5. The method of claim 1, wherein the first terminal starts the session transfer as soon as possible when the session continuity level information includes the first level.

6. The method of claim 1, wherein the session continuity operator policy is transmitted through an Open Mobile Alliance (OMA) Device Management (DM) interface.

7. The method of claim 1, wherein the session continuity operator policy includes restricted networks.

8. A method for supporting session continuity for a first terminal that cooperates with a network, the method performed by the network and comprising:
    sending, by the network, a session continuity operator policy while the first terminal is performing a session through an original network with a second terminal, the session continuity operator policy including a parameter indicating whether to transfer a whole or part of the session as a session transfer, wherein the session continuity operator policy includes a parameter indicating a preferred network for a transfer of an ongoing session, and session continuity level information including one of a first level indicating that the first terminal starts a session transfer to the preferred network and a second level indicating that starting of the session transfer is performed based on a decision of the first terminal;
    receiving, by the network, a first session invite message from the first terminal to transfer the whole of the session or transfer the part of the session, unless the session continuity level information of the operator policy is the second level and the first terminal decides not to start session transfer; and
    sending, by the network, a second session invite message to the second terminal to transfer the session to the target network, in response to a receipt of the first session invite message,
    wherein the first session invite message includes a Request Uniform Resource Identifier (R-URI) and includes information about at least one data to be transferred among voice data and non-voice data for the session,
    wherein the session transfer corresponds to PS (Packet Switching) to PS transfer, and
    wherein a second session invite message is transmitted from the server to the second terminal within the preferred network to achieve session continuity.

9. The method of claim 8, wherein the first session invite message includes a Replace header.

10. The method of claim 8, wherein the session continuity operator policy includes a parameter indicating a type of session transfer.

11. The method of claim 8, wherein the session continuity operator policy includes a parameter indicating an unallowable domain or network for the session transfer.

12. The method of claim 8, further comprising:
    generating the session continuity operator policy based on collected information.

13. The method of claim 12, wherein the information is received from an external entity or collected by the server.

14. The method of claim 8, further comprising:
    receiving the session continuity operator policy from an external entity.

15. The method of claim 8, wherein the first terminal starts the session transfer as soon as possible when the session continuity level information includes the first level.

16. The method of claim 8, wherein the session continuity operator policy is received through an Open Mobile Alliance (OMA) Device Management (DM) interface.

17. The method of claim 8, wherein the session continuity operator policy includes restricted networks.

* * * * *